(12) United States Patent
Rarick

(10) Patent No.: US 6,917,956 B2
(45) Date of Patent: Jul. 12, 2005

(54) APPARATUS AND METHOD FOR EFFICIENT MODULAR EXPONENTIATION

(75) Inventor: Leonard D. Rarick, San Diego, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 654 days.

(21) Appl. No.: 09/929,462

(22) Filed: Aug. 14, 2001

(65) Prior Publication Data

US 2003/0037087 A1 Feb. 20, 2003

(51) Int. Cl.[7] .............................................. G06F 7/72
(52) U.S. Cl. ...................................................... 708/491
(58) Field of Search ................................. 708/491, 492

(56) References Cited

U.S. PATENT DOCUMENTS 6,151,393 A * 11/2000 Jeong .......................... 380/265
6,185,596 B1 * 2/2001 Hadad et al. ................ 708/491
6,748,410 B1 * 6/2004 Gressel et al. .............. 708/491

OTHER PUBLICATIONS

By M. Moris Mano, California State University, Los Angeles "Computer System Architecture" 1976 by Prentice–Hall, Inc., Englewood Cliffs, N.J p. 242–249, Ch. 7, Sec. 7–3.

By Alfred J. Menezes, Paul C. van Oorschot and Scott A. Vanstone "Handbook of Applied Cryptography" 1997 by CRC Press LLC, Boca Raton, Florida p. 602–603 (14.33–14.41, 14.3.3); p. 619–620 (14.6, 14.92–14.96, 14.6.2).

* cited by examiner

Primary Examiner—D. H. Malzahn
(74) Attorney, Agent, or Firm—Martine Penilla & Gencarella, LLP

(57) ABSTRACT

An improved apparatus and method for modular multiplication and exponentiation to achieve efficient computation involved in Montgomery multiplication is provided. Currently employed conventional iteration methods involve carry look-ahead additions. To overcome the time taken by carry look-ahead additions, there is thus provided, in accordance with a preferred embodiment of the present invention, an apparatus and method for separately storing and tracking the sum and the carry of the addition involved in Montgomery multiplication. In such a manner, the present invention achieves fast addition times since they are not dependent on the time to compute the carries. As a result, the iterations are carried out much faster than previously possible. By representing the value A in the Montgomery multiplication algorithm with a redundant notation, the sum and the carry of the addition are separately stored and tracked, thereby avoiding the delays involved in the computation of the carries. In such a manner, by separately storing and tracking the sum and the carry of the addition, this carry-save addition enables a much faster computation involved in Montgomery multiplication.

24 Claims, 15 Drawing Sheets

APPARATUS AND METHOD FOR EFFICIENT MODULAR EXPONENTIATION

BACKGROUND OF THE INVENTION

1. Field of the Invention

The present invention relates to efficient modular exponentiation, and more particularly, to an improved apparatus and method for efficient computation involved in Montgomery multiplication.

2. Description of Related Art

In the field of applied cryptography, one of the most important arithmetic operations for public-key cryptography is exponentiation. It is required in the widely used RSA algorithm, as well as in the ElGamal encryption scheme and the Diffie-Hellman key agreement. In these applications, the form of exponentiation used is modular exponentiation, i.e., $a^x$ mod m is computed for some integers a, x, and m. This computation can be accomplished by forming powers of a and multiplying some of them together to obtain $a^x$. The desired result is then obtained by finding the remainder when divided by m. Multiplication is the operation used in both forming the powers of a and in multiplying them together. However, since only the remainder when divided by m is desired, a full multiplication is not required. Only enough information needs to be maintained during multiplication in order to obtain the final remainder. To that end, the scheme known as the Montgomery multiplication is often used.

The algorithm for Montgomery multiplication, as given in the Handbook of Applied Cryptography, algorithm 14.36, is:

INPUT: integers $m=(m_{n-1} \ldots m_1 m_0)_b$, $x=(x_{n-1} \ldots x_1 x_0)_b$, $y=(y_{n-1} \ldots y_1 y_0)_b$, with $0 \leq x, y < m$, $R=b^n$ with $\gcd(m, b)=1$, and $m'=-m^{-1}$ mod b OUTPUT: $xyR^{-1}$ mod m.

1. $A \leftarrow 0$. (Notation: $A=(a_n a_{n-1} \ldots a_1 a_0)_b$.)
2. For i from 0 to (n−1) do the following:
   2.1 $u_i \leftarrow (a_0 + x_i y_0) m'$ mod b.
   2.2 $A \leftarrow (A + x_i y + u_i m)/b$.
3. If $A \geq m$ then $A \leftarrow A - m$.
4. Return A.

In computer implementations, the value of b is always a power of 2. That is, $b=2^k$ for some integer k. Then, step 2.1 requires two k-bit multiplies, one to compute $x_i y_o$ and the other to multiply by m'. Step 2.2 requires 2n multiplies, n to multiply y by $x_i$ and another n to multiply m by $u_i$. Thus, the bulk of the work is performed in step 2.2. To carry out a multiply, the bits are combined together with the "AND" operation, thereby forming partial sums. Then, these partial sums are added together. The multiplication of y by $x_i$ creates k partial sums and the multiplication of m by $u_i$ creates another k partial sums. These 2k partial sums are added together with the previous value of A to obtain the new value of A. It should be noted that the value of A has an additional k bit digit compared to that of m or n. In this particular example, A has n+1 number of digits, while m and n each has n number of digits. Although the above notation indicates that A is a base b value, for the purposes of addition, each digit $a_i$ is k binary bits. So A is just one more term to be included in the addition. The addition of these 2k+1 terms can be done with a Wallace tree, resulting in two terms which are then added with a carry look-ahead adder to obtain the new value of A. It should be noted that the division by b is just a shift of k bits.

In the case where b=2 (that is, k=1), the algorithm becomes:

INPUT: integers $m=(m_{n-1} \ldots m_1 m_0)_2$, $x=(x_{n-1} \ldots x_1 x_0)_2$, $y=(y_{n-1} \ldots y_1 y_0)_2$, with $0 \leq x, y < m$, $R=2^n$ with m odd, and $m'=1$.

OUTPUT: $xyR^{-1}$ mod m.

1. $A \leftarrow 0$.
2. For i from 0 to (n−1) do the following:
   2.1 $u_i \leftarrow a_0 + x_i y_0$ mod 2.
   2.2 $A \leftarrow (A + x_i y + u_i m)/2$.
3. If $A \geq m$ then $A \leftarrow A - m$.
4. Return A.

Step 2.1 is very easy, as the computation of $x_i y_0$ is only an "AND" operation. This is followed by the addition of $a_0$ mod 2, which is just an "XOR" operation. Step 2.2 is the "ADDITION" of three values, the particular "ADD" operation chosen from one of the following, depending on the $x_i$ and $u_i$ values:

"ADD" A+y+m if $x_i=1$ and $u_i=1$.
"ADD" A+y+0 if $x_i=1$ and $u_i=0$.
"ADD" A+0+m if $x_i=0$ and $u_i=1$.
"ADD" A+0+0 if $x_i=0$ and $u_i=0$.

Since neither y nor m changes during the execution of this algorithm, y+m may be computed once before starting, and so step 2.2 becomes just selecting which of y+m, y, m, or 0 is to be added to A, adding the two values, then shifting this result by one place. Thus, when b=2, the bulk of the computation time in this algorithm is the carry look-ahead addition of the two values in step 2.2. As well known in the prior art, complete addition requires a delay in computational time because each digit of the sum can be determined only after the carry from the previous digits has been computed. Although carry look-ahead methods obtain all of the carries with a parallel technique, the time required is order log n, where n is the number of bits to be added. Even though order log n time is much faster than linear time (order n), it is slower than constant time.

Therefore, currently employed conventional computational methods that involve the carry look-ahead addition precludes the efficient utilization of current computer processor power. Although current computers are able to carry out many complex computations simultaneously, as described above, the carry look-ahead addition slows down the speed of iterations involved in Montgomery multiplication by quite a bit. It would thus be highly desirable if the addition of step 2.2 could be carried out in constant time rather than in order log n time. Constant time processing would enable much quicker computation and provide an efficient method of Montgomery multiplication.

SUMMARY OF THE INVENTION

The present invention provides an improved apparatus and method for modular multiplication and exponentiation to achieve efficient computation involved in Montgomery multiplication. Currently employed conventional computational methods that involve carry look-ahead addition make constant time computation impossible. In order to overcome this shortcoming, there is thus provided, in accordance with a preferred embodiment of the present invention, an apparatus and method for separately storing and tracking the sum and the carry of the addition involved in Montgomery multiplication. In such a manner, the present invention achieves constant time processing and carries out the iterations much faster than previously possible.

As well known in the prior art, complete addition requires a delay in computational time because each digit of the sum can be determined only after the carry from the previous digits has been computed. Although carry look-ahead methods obtain all the carries with a parallel technique, the time required is order log n, where n is the number of bits to be added. Even though order log n time is much faster than linear time (order n), it is slower than constant time. Since computers are capable of carrying out many computations simultaneously, a method that can be done in constant time would be faster than an order log n time method. Carry-save addition does not require the carry from the previous digits, and so all of the carry-save additions may take place at the same time with no prior delay. By representing the value of A in the Montgomery multiplication algorithm with a redundant notation, the sum and the carry of the addition is separately stored and tracked, thereby avoiding the delays involved in carry look-ahead additions. In such a manner, by separately storing and tracking the sum and the carry of the addition, this carry-save addition enables much faster constant time computation involved in Montgomery multiplication.

A more complete understanding of the efficient modular exponentiation that makes efficient Montgomery multiplication possible will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

Figure 1:
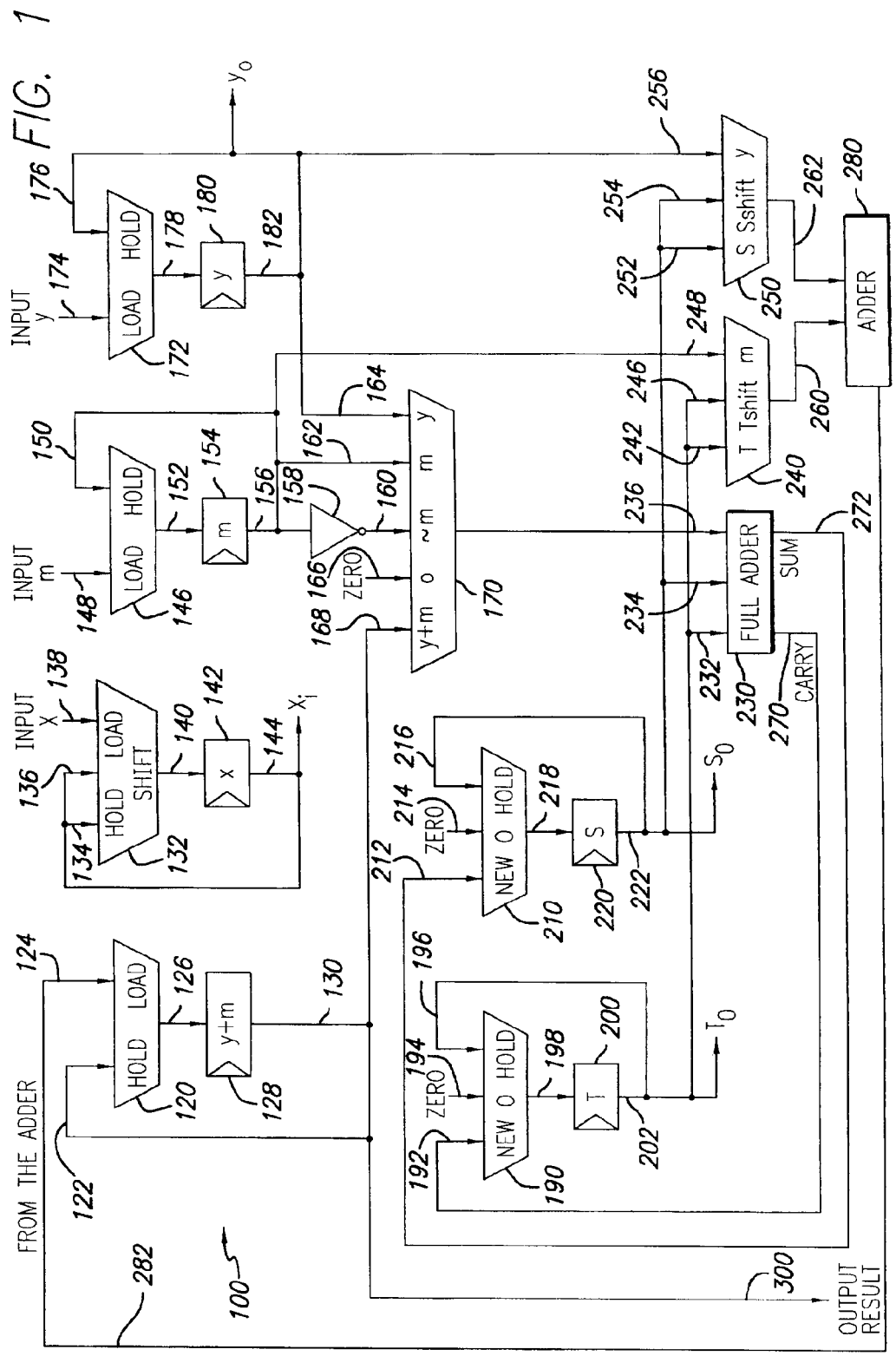
FIG. 1 is a schematic block diagram of a circuit for efficient Montgomery multiplication.

The present invention is directed to an improved apparatus and method for modular multiplication and exponentiation to achieve efficient computation involved in Montgomery multiplication. As described above, the currently employed conventional computational methods that involve carry look-ahead addition make constant time computation impossible. Therefore, in order to achieve constant time processing, the sum and the carry of the addition have to be separately stored and tracked during the add computation. This method of separately storing and tracking the sum and the carry of the addition, hereinafter referred to as carry-save addition, enables a much faster computation involved in Montgomery multiplication. In the detailed description that follows, like element numerals are used to describe like elements illustrated in one or more of the figures.

The value of A in the Montgomery multiplication algorithm is represented in the standard notation of $j=(n+1)k$ bits. That is, $A=\alpha_j \alpha_{j-1} \ldots \alpha_2 \alpha_1 \alpha_0$ where each $a_i$ represents k of the $\alpha_h$ bits. This representation of A is replaced with a redundant notation where each $\alpha_h$ bit is replaced with two bits $\sigma_h$ and $\tau_h$. The value for each position in this new representation of A is the sum of the two bits. Hence, $\sigma_h=0$ and $\tau_h=0$ represents the value of 0, $\sigma_h=0$ and $\tau_h=1$ represents the value of 1, $\sigma_h=1$ and $\tau_h=0$ represents the value of 1, $\sigma_h=1$ and $\tau_h=1$ represents the value of 2.

It should be noted that the standard binary value of A can be recovered by addition S+T where $S=\sigma_j\sigma_{j-1}\ldots\sigma_2\sigma_1\sigma_0$ and $T=\tau_j\tau_{j-1}\ldots\tau_2\tau_1\tau_0$. With this notation, the algorithm can be expressed as follows:

INPUT: integers $m=(m_{n-1}\ldots m_1m_0)_b$, $x=(x_{n-1}\ldots x_1x_0)_b$, $y=(y_{n-1}\ldots y_1y_0)_b$, with $0 \leq x$, $y<m$, $R=b^n$ with gcd(m, b)=1, and $m'=-m^{-1}$ mod b.

OUTPUT: $xyR^{-1}$ mod m.

1. S←0 and T←0. (Notation: $S=(s_ns_{n-1}\ldots s_1s_0)_b$ and $T=(t_nt_{n-1}\ldots t_1t_0)_b$.)
2. For i from 0 to (n−1) do the following:
   2.1 $u_i \leftarrow (s_0+t_0+x_iy_0)$ m' mod b.
   2.2 $(S, T) \leftarrow (S+T+x_iy+u_im)/b$.
3. $A_1 \leftarrow S+T$ and $A_2 \leftarrow S+T-m$.
4. If $A_2 \geq 0$ then $A \leftarrow A_2$ else $A \leftarrow A_1$
5. Return A.

In this notation, each $s_i$ represents k of the $\sigma_h$ bits and each $t_i$ represents k of the $\tau_h$ bits. Step 2.1 of above requires the addition of three terms instead of two. Step 2.2 of above adds the 2k terms from the partial sums along with the two additional terms from S and T. The Wallace tree to perform this addition takes no more time than the time to add the 2k+1 terms of the original algorithm plus one additional full adder time. The larger the value of b, the less additional time is usually needed, and in some cases no additional time is required to include one more term. The output of the Wallace tree is two terms, which in the original algorithm were added to obtain the new value of A. In the new algorithm, this addition is not performed and the two terms that result from the Wallace tree are the new values of S and T. Since the carry look-ahead addition is much slower than the extra time needed for the larger Wallace tree addition required in the carry-save addition (which is one full adder time or less), step 2.2, where the bulk of the time is spent, takes much less time. In addition, it should be noted that the each of the values of S and T has the same number of bits as that of m and n.

In the preferred embodiment of the invention where b=2 (that is, k=1), $s_i=\sigma_i$ and $t_i=\tau_i$, the new algorithm becomes:

INPUT: integers $m=(m_{n-1}\ldots m_1m_0)_2$, $x=(x_{n-1}\ldots x_1x_0)_2$, $y=(y_{n-1}\ldots y_1y_0)_2$ with $0\leq x$, $y<m$, $R=2^n$ with m odd, and m'=1.

OUTPUT: $xyR^1$ mod m.
1. S←0 and T←0.
2. For i from 0 to (n−1) do the following:
   2.1 $u_i$←$s_0$+$t_0$+$x_i y_0$ mod 2.
   2.2 (S, T)←(S+T+$x_i$y+$u_i$m)/2.
3. $A_1$←S+T and $A_2$←S+T−m.
4. If $A_2 \geq 0$ then A←$A_2$ else A←$A_1$
5. Return A.

Step 2.1 is very easy, as the computation of $x_i y_0$ is only an "AND" operation and the additional mod 2 of $s_0$ and $t_0$ is an "XOR" operation. This is followed by the addition of these two results mod 2, which is just another "XOR" operation. Step 2.2 is the "ADDITION" of four values, the particular "ADD" operation chosen from one of the following, depending on the $x_i$ and $u_i$ values:
   "ADD" S+T+y+m if $x_i$=1 and $u_i$=1.
   "ADD" S+T+y+0 if $x_i$=1 and $u_i$=0.
   "ADD" S+T+0+m if $x_i$=0 and $u_i$=1.
   "ADD" S+T+0+0 if $x_i$=0 and $u_i$=0.

As before, neither y nor m changes during the execution of this algorithm, so y+m may be computed once before starting, and thus step 2.2 becomes just selecting which of y+m, y, m, or 0 is to be "added" to S and T. The "adding" of the three values (S and T and one of y+m, y, m, or 0) to obtain the two new values of S and T is accomplished with n full adders, one for each bit position. Since they operate in parallel, the time taken is that of just one full adder. As before, the division by 2 is just a shift of one place. Thus, when b=2, the time for the carry look-ahead addition in the original algorithm is replaced with the time of one full adder.

In addition to the computational speed advantage gained by utilizing the carry-save add while iterating instead of carry look-ahead add, the present invention possesses advantages in its implementation as well. Similar to the value of A discussed previously, the value of y+m has an additional bit compared to that of m or n. Because neither S nor T has an additional bit compared to m or n, it is easier to implement multiple small multiplies in the same hardware as one big multiply. Consider making a Montgomery multiplication that can either carry out a 2048 bit multiply or two 1024 bit multiplies. Using the conventional method, in the 2048 bit mode, one needs to provide a 2048 bit x, a 2048 bit y, a 2048 bit m, and a 2049 bit A. Similarly, in the 1024 bit mode, one needs to provide two 1024 bit x's, two 1024 bit y's, two 1024 bit m's, and two 1025 bit A's. Because of the extra bit of A, the implementation is more complex and likely to be slower. In contrast, by using the redundant notation of the present invention, this problem is rendered moot. In the 2048 bit mode, one needs to provide a 2048 bit x, y, m, S, and T. In the 1024 bit mode, one needs to provide two 1024 bits for each value of x, y, m, S, and T.

As mentioned above, the value of y+m has an additional bit, which requires either a 2049 bit value or a 1025 bit value, depending on the mode. Instead of using a full adder, the extra bit is inserted into an otherwise empty position. A property of the Montgomery multiplication is that the least significant sum bit before dividing by two is always zero. If carrying out the multiplies (such as the two 1024 multiplies discussed above), then this least significant sum bit=0, when shifted in order to divide by 2, becomes the most significant sum bit in the next multiply, exactly where one needs to insert the extra bit present in the y+m value. Since the shifted bit is always zero, all that is required is to perform an "OR" operation on the shifted bit (i.e., least significant bit of the left multiply) with the extra y+m bit (i.e., most significant bit of the right multiply). In this manner, a simpler implementation is possible using the principles of the present invention.

Referring now to FIG. 1, a schematic 100 for the efficient Montgomery multiplication of the present invention is provided. In FIG. 1, there are a plurality of multiplexers 120, 132, 146, 172, 190, and 210 and flip-flops 128, 144, 154, 180, 202, and 220 that comprise memory units to hold the values of y+m, x, m, y, S, and T. For each multiplexer 120, 132, 146, 170, 172, 190, 210, 240, and 250, one of the data inputs is selected for each respective multiplexer depending on its respective control inputs. It should be noted that for the sake of simplicity, the control wires are not shown in FIG. 1. For each flip-flop 128, 142, 154, 180, 200, and 220, its respective data output remains unchanged during a clock cycle and is the value of its input at the end of the previous clock cycle. The full adder 230 adds the three input buses producing the SUM 272 and the CARRY 270. The values of $x_i$, $y_0$, $S_0$, $T_0$ are the least significant bits from each bus. The adder 280 adds the two outputs 260 and 262 from the multiplexers 240 and 250, respectively, and produces an output 282, which then is provided as input 124 for multiplexer 120.

The four multiplexers 120, 132, 146, and 172, along with four flip-flops 128, 142, 154 and 180, and inverter 158 work in combination to provide four of the five inputs of y+m, ~m, m, and y for multiplexer 170. The two inputs of multiplexer 120 include HOLD 122 and LOAD 124. Input 122 is the output 130 of flip-flop 128 and input 124 is the output 282 of the adder 280. Multiplexer 120 provides an output 126 that is further provided as an input to flip-flop 128 to produce an output of 130, which is the value of y+m. At the conclusion of the Montgomery multiplication, flip-flop 128 holds the result that is output on 130 and 300. The three inputs of multiplexer 132 include HOLD 134, SHIFT 136, and LOAD 138. Inputs 134 and 136 are the output of flip-flop 142 and input 138 is the input value of x. Multiplexer 132 provides an output 140 that is further provided as an input to flip-flop 142 to produce an output of 144, which is the value of x. The two inputs of multiplexer 146 include LOAD 148 and HOLD 150. Input 148 is the input value of m and input 150 is the output of flip-flop 154. Multiplexer 146 provides an output 152 that is further provided as an input to flip-flop 154 to produce an output of 156, which is the value of m. The two inputs of multiplexer 178 include LOAD 174 and HOLD 176. Input 174 is the input value of y and input 176 is the output of flip-flop 180. Multiplexer 172 provides an output 178 that is further provided as an input to flip-flop 180 to produce an output of 182, which is the value of y.

The five inputs 168, 166, 160, 162, and 164 of multiplexer 170 are derived from the outputs of flip-flops 128, 142, 154, and 180. Input 168 of y+m is the output 130 of flip-flop 128. Input 166 is simply the value of zero. Input 160 of ~m is the output of inverter 158 whose input is the output 156 of flip-flop 154. Input 162 of m is the output 156 of flip-flop 154. Finally, input 164 of y is the output 182 of flip-flop 180.

Figure 2:
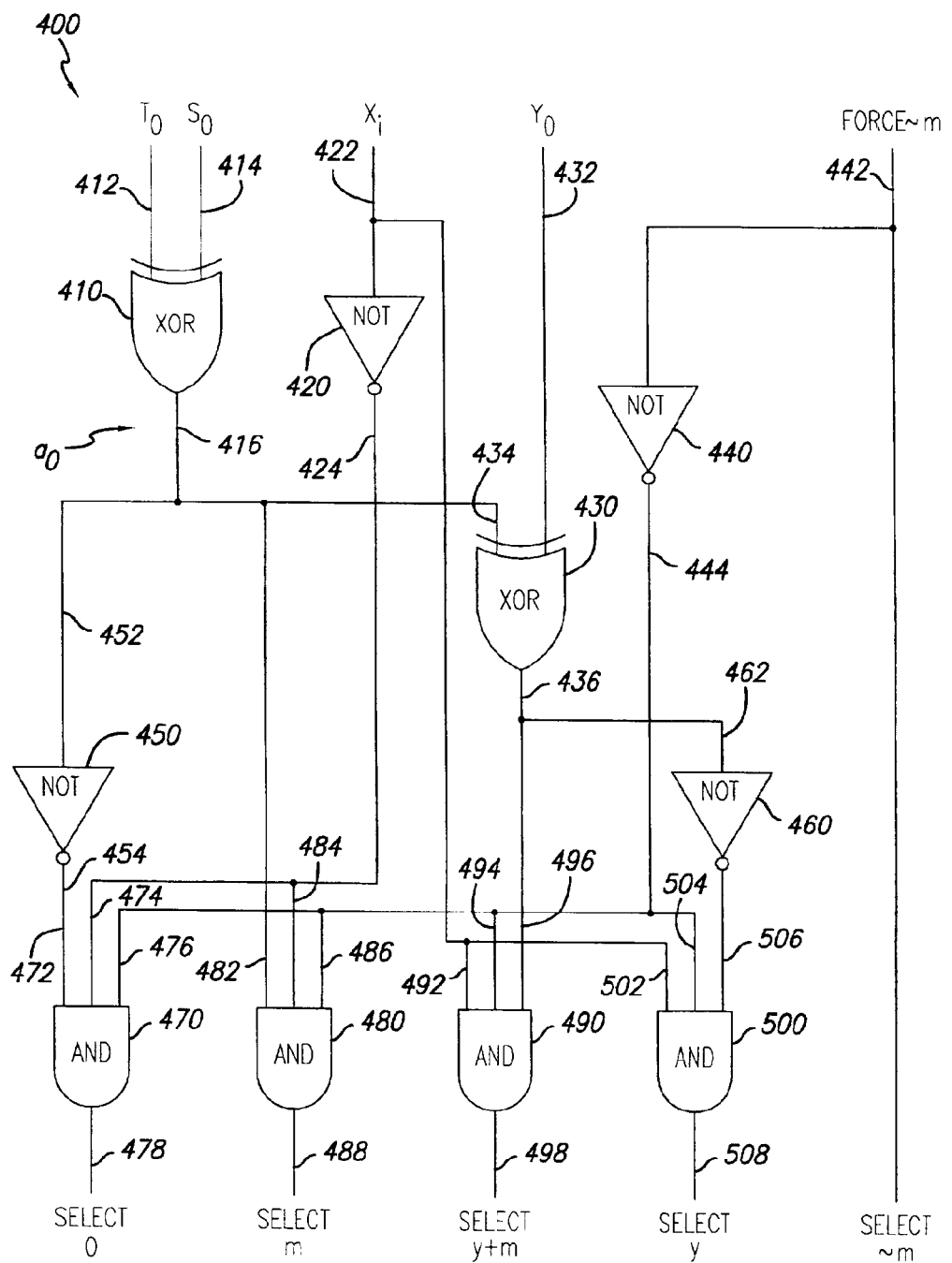
FIG. 2 is a schematic block diagram of a circuit for determining the select control values for the five-input multiplexer of FIG. 1.

As described above, step 2.2 of the algorithm for efficient Montgomery multiplication just becomes selecting which of y+m, y, m, or 0 is to be "added" to S and T. FIG. 2 illustrates how one of the four values y+m, y, m, or 0 (input values for multiplexer 170) is selected for addition to S and T. In FIG. 2, the input values of $x_i$, $y_0$, $S_0$, $T_0$ are used to set the multiplexer 170 to select one of y+m, y, m, or 0 for each iteration of step 2.2. $T_0$ and $S_0$ are provided as inputs 412 and 414, respectively, to the XOR gate 410 to produce an output $a_0$ 416. $x_i$ is provided as input 422 for inverter 420 to produce output 424. Input 434 includes the output $a_0$ 416 from XOR gate 410, while the other input 432 of XOR gate 430 includes $y_0$. XOR gate 430 produces an output 436. Force ~m serves as input 442 to inverter 440 to produce an output 444.

As illustrated in FIG. 2, four AND gates produce an appropriate output to determine which of y+m, y, m, or 0 is to be "added" to S and T. Of the AND gates 470, 480, 490, and 500, each has three inputs and one resulting output. AND gate 470 includes inputs 472, 474, and 476. Input 472 is the output 454 of the inverter 450. The input 452 of the inverter 450 is in turn the output $a_0$ 416 of the XOR gate 410. Input 474 is the output 424 of inverter 420. The input 476 is the output 444 of inverter 440. AND gate 480 includes inputs 482, 484, and 486. Input 482 is the output 416 of the XOR gate 410. The input 484 is the output 424 of inverter 420 and the input 486 is the output 444 of inverter 440. AND gate 490 includes inputs 492, 494, and 496. Input 492 is $x_i$, while input 494 is the output 444 of inverter 440. The input 496 is the output 436 of XOR gate 430. AND gate 500 includes inputs 502, 504, and 506. Input 502 is $x_i$, while input 504 is the output 444 of inverter 440. The input 506 is the output of the inverter 460, which has its input 462 from the output 436 of the XOR gate 430. The outputs 478, 488, 498, 508 of these four AND gates, along with the value of 442, in turn determine which of y+m, y, m, or 0 is to be "added" to S and T. It should be noted that by adding one to the value ~m of 442, −m is obtained. Therefore, by using value ~m, the value of S+T−m can be obtained by adding the values of S+T+(~m)+1.

Referring back FIG. 1, once multiplexer 170 has determined the output, the output is provided as one of the inputs for the FULL ADDER 230. The FULL ADDER 230 also has two other inputs 232 and 234, which are derived from multiplexers 190, 210 and flip-flops 200, 220. Multiplexer 190 includes inputs NEW 192, ZERO 194, and HOLD 196. Input 192 is the CARRY output 270 of the FULL ADDER 230, not shifted to accomplish the divide by two in step 2.2. Input 194 is the value "0". Input 196 is the output 202 of the flip-flop 200. Multiplexer 190 has an output 198 provided as an input to flip-flop 200 to produce an output of 182, which is the value of T. Multiplexer 210 includes three inputs NEW 212, ZERO 214, and HOLD 216. Input 212 is the SUM output 272 of the FULL ADDER 230, shifted by one bit to accomplish the divide by two in step 2.2. Input 214 is the value "0". Input 216 is the output 222 of the flip-flop 220. Multiplexer 210 has an output 218 provided as an input to flip-flop 220 to produce an output of 222, which is the value of S. The values of T and S serve as inputs 232 and 234, respectively, of the FULL ADDER 230, along with the output 236 of the multiplexer 230. The FULL ADDER 230 produces two outputs, including the CARRY 270 and the SUM 272.

Multiplexers 240 and 250 each has three inputs. Multiplexer 240 has three inputs including T 242, T shifted 246, and m 248. Input T 242 is the output 202 of the flip-flop 200, T shifted 246 is also the output 202 of the flip-flop 200, and m 248 is the output 156 of flip-flop 154. Multiplexer 240 provides an output 260. Multiplexer 250 has three inputs including S 252, S shifted 254, and y 256. Input S 252 is the output 222 of the flip-flop 220, S shifted 254 is also the output 222 of the flip-flop 220, and y 256 is the output 182 of flip-flop 180. Multiplexer 250 provides an output 262. The outputs 260 and 262 from multiplexers 240 and 250, respectively, serve as inputs of the ADDER 280, which adds the two inputs and produces the sum as the output 282. This output 282 becomes available as input 124 for multiplexer 120.

Figure 3:
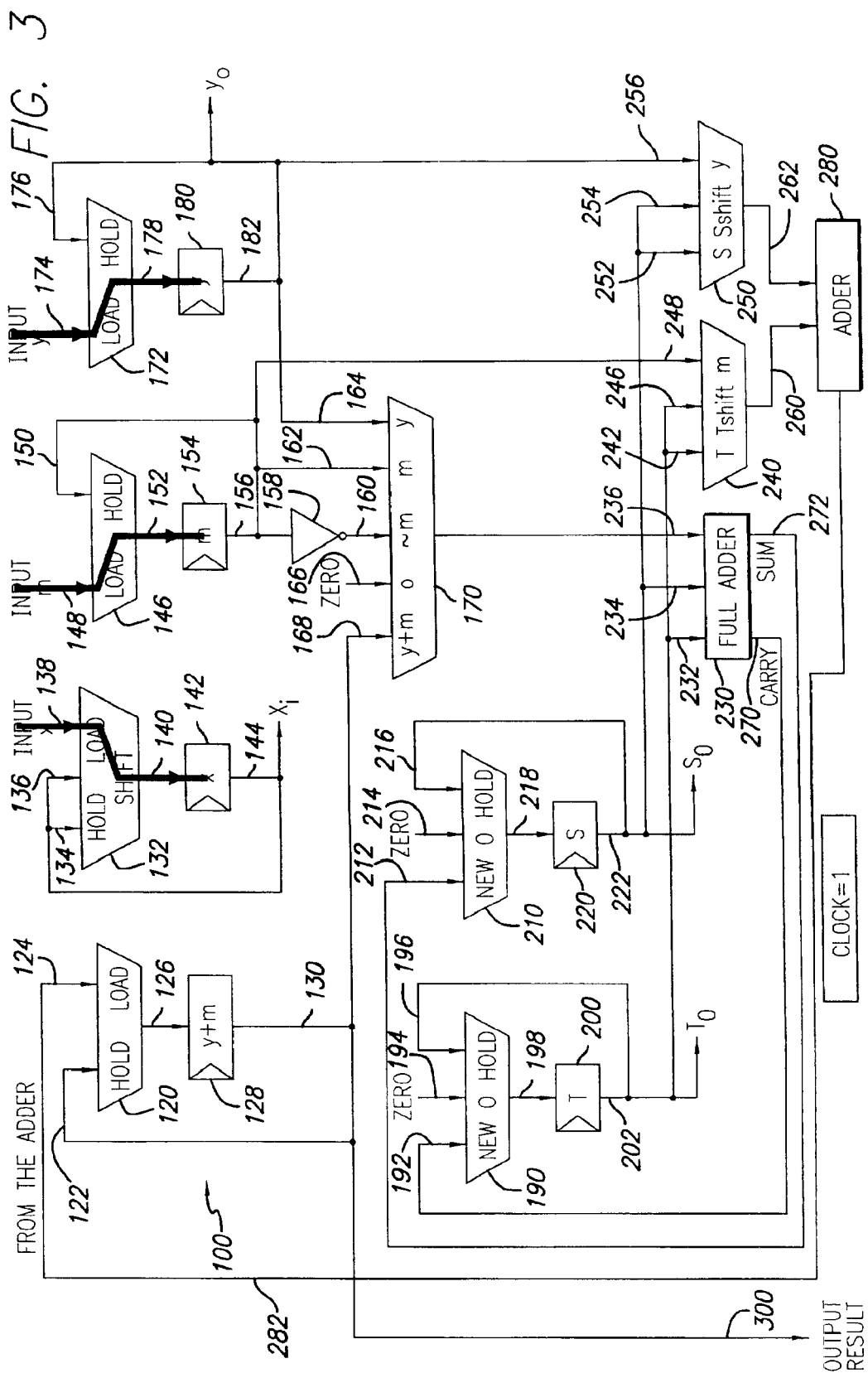
FIG. 3 is the schematic block diagram of FIG. 1 shown at clock cycle=1.
Figure 4:
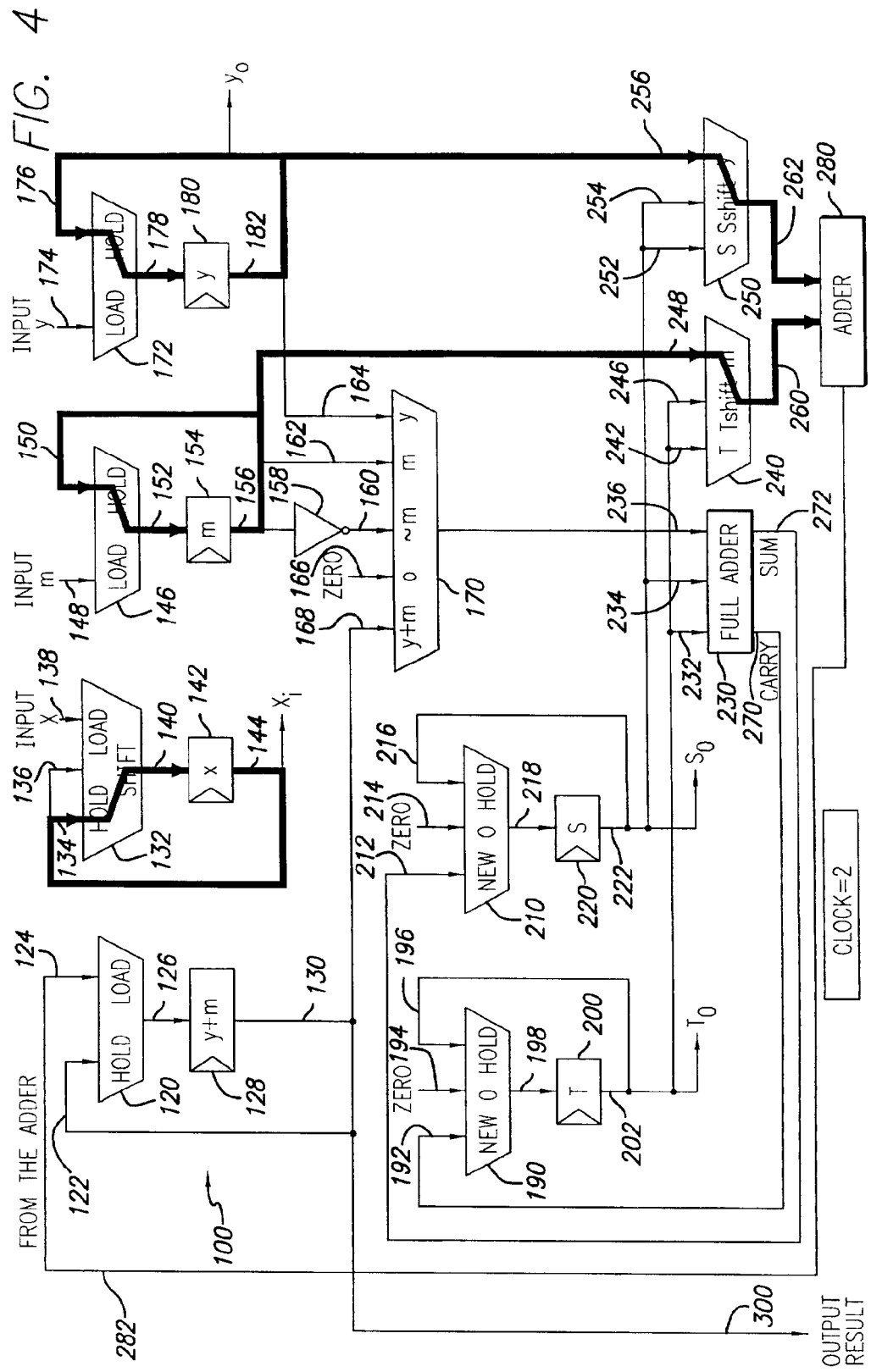
FIG. 4 is the schematic block diagram of FIG. 1 shown at clock cycle=2.
Figure 5:
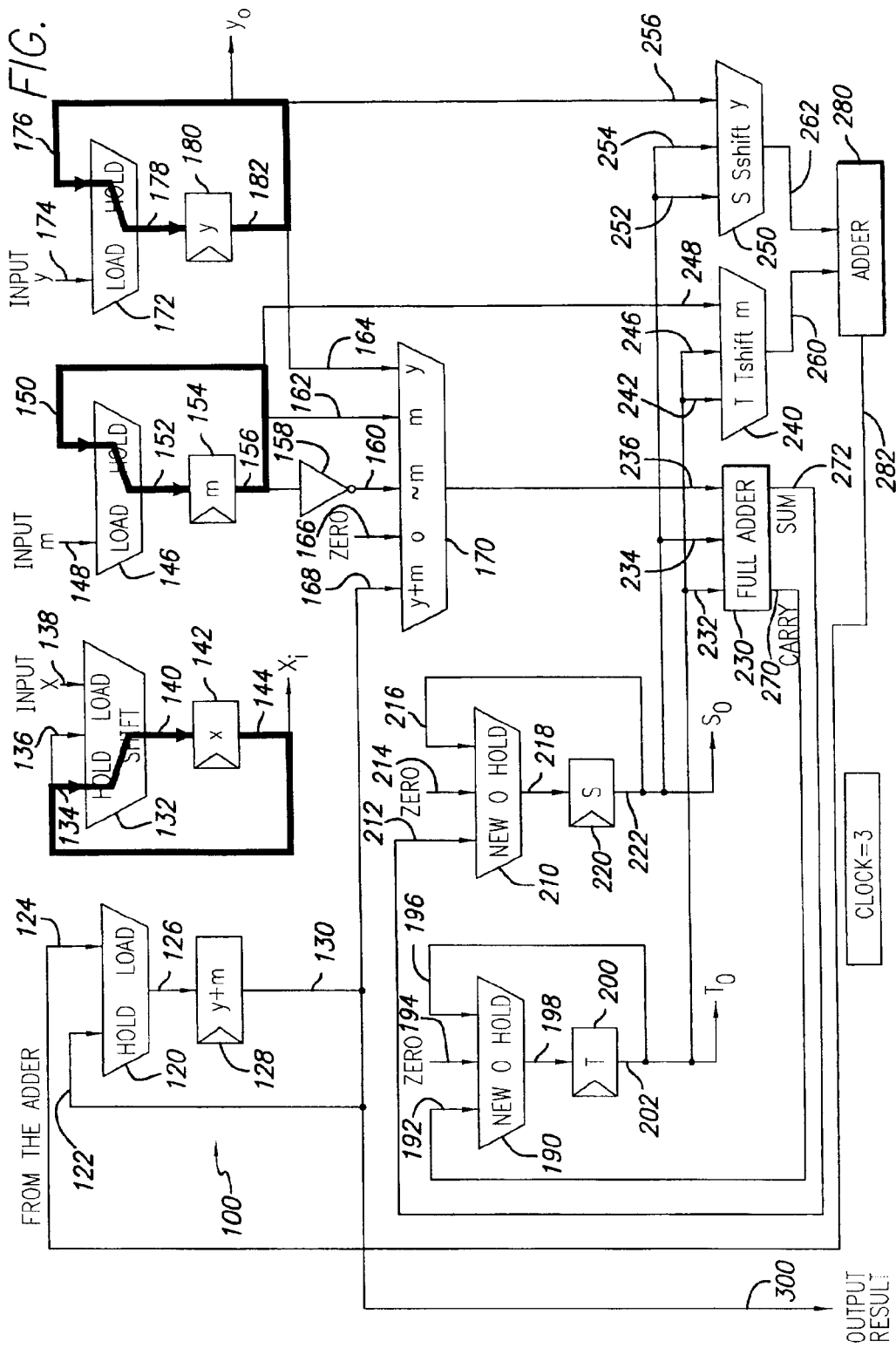
FIG. 5 is the schematic block diagram of FIG. 1 shown at clock cycle=3.
Figure 6:
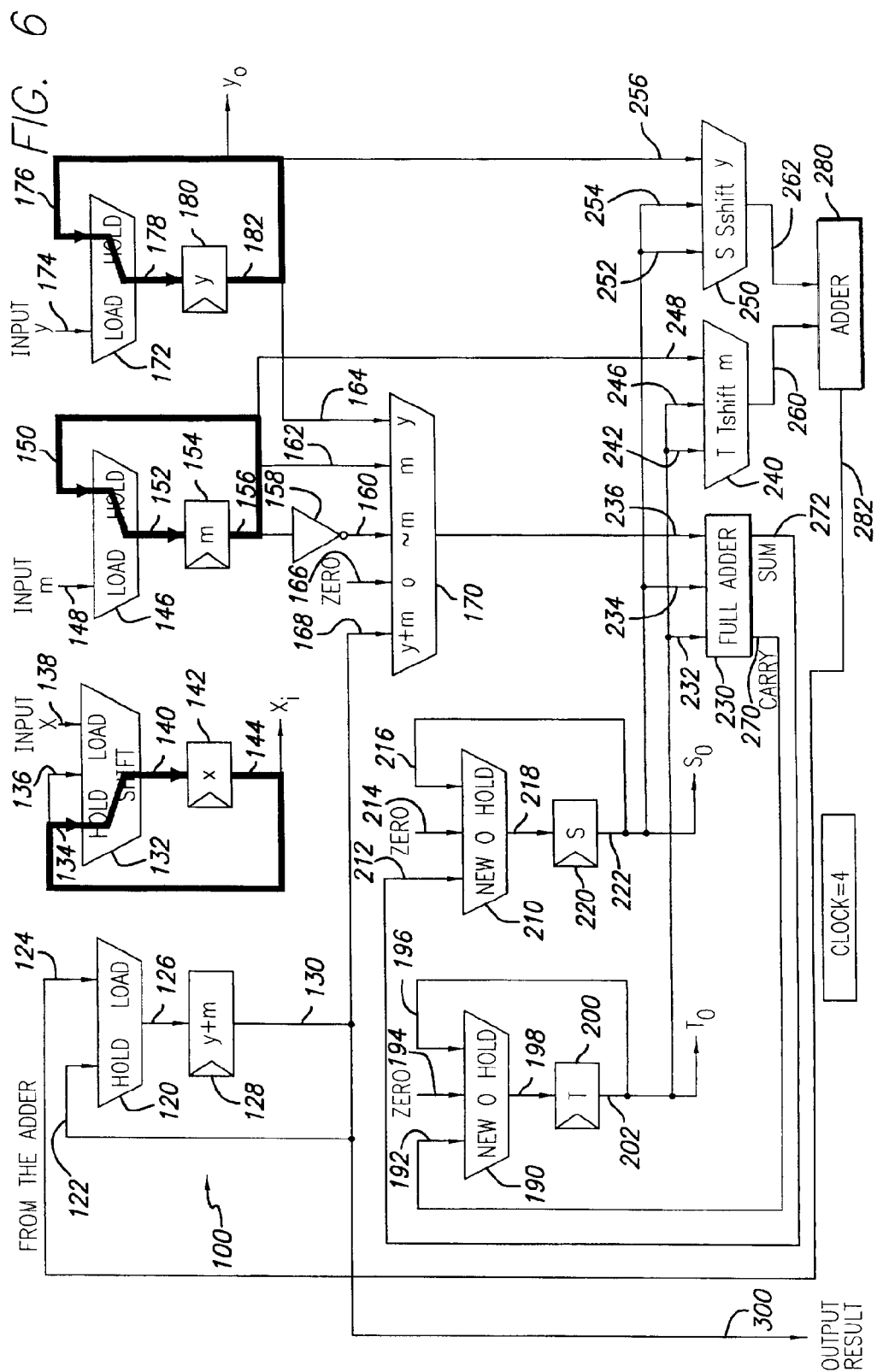
FIG. 6 is the schematic block diagram of FIG. 1 shown at clock cycle=4.

At this point, a description of the active states of the various devices illustrated in FIG. 1 will be provided for each clock cycle. The bold lines of FIGS. 3–15 reflect the active states of the data throughout each clock cycle. As shown in FIG. 3, during clock cycle 1, the LOAD inputs x, y, and m are loaded into multiplexers 132, 146, and 172. As a result, the outputs 140, 152, 178 of multiplexers 132, 146, 172, respectively, are these loaded values. As shown in FIG. 4, during the next clock cycle 2, the flip-flops 142, 154, and 180 produce outputs 144, 156, and 182, respectively, that equal the input values. Now, the HOLD inputs 134, 150, and 176 of multiplexers 132, 146, and 172, respectively, are available during this clock cycle 2. Furthermore, the outputs 156 and 182 are provided as inputs 248 and 256, respectively. These inputs 248 and 256 of multiplexers 240 and 250, respectively, make the m and y values available for the outputs 260 and 262. These two outputs 260 and 262 are provided to the ADDER 280 in order to produce an output sum 282 after the next two clock cycles. The ADDER 280 executes the carry-look ahead to obtain the sum of the two values as a single value. In an embodiment of the invention, it takes two clock cycles to get a result back from the ADDER 280 because of the data size used (i.e., 4096). It should be noted, however, that other clock cycle schemes might be employed depending on the different data sizes. The present example is not intended to be limiting in any sense. For this reason, in this embodiment of the invention, as show in FIGS. 5 and 6, respectively, clock cycles 3 and 4 are occupied for the calculation of the ADDER 280.

Figure 7:
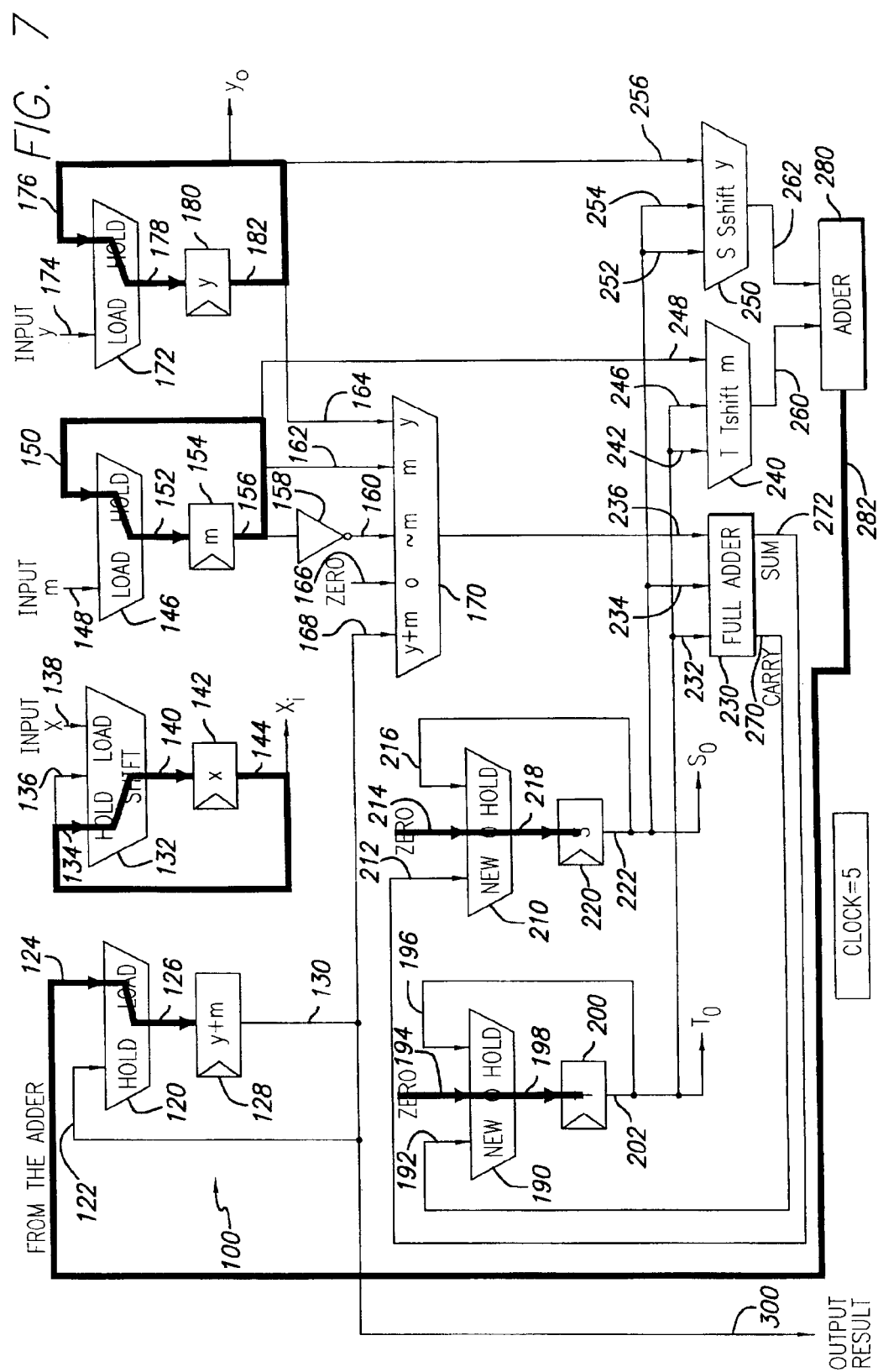
FIG. 7 is the schematic block diagram of FIG. 1 shown at clock cycle=5.
Figure 8:
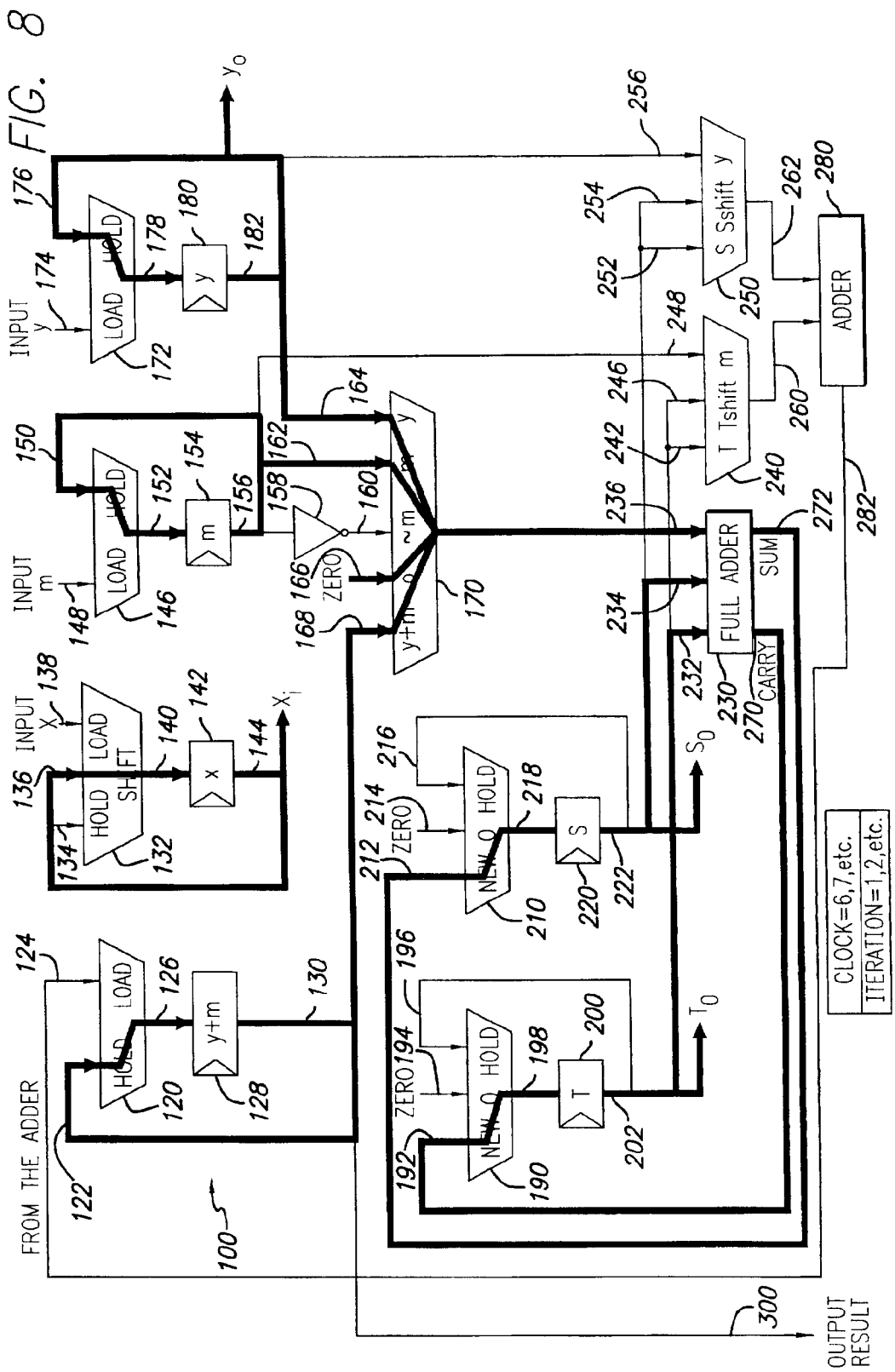
FIG. 8 is the schematic block diagram of FIG. 1 shown at clock cycle=6 through N+4 with one iteration per clock cycle=1 through N−1.
Figure 9:
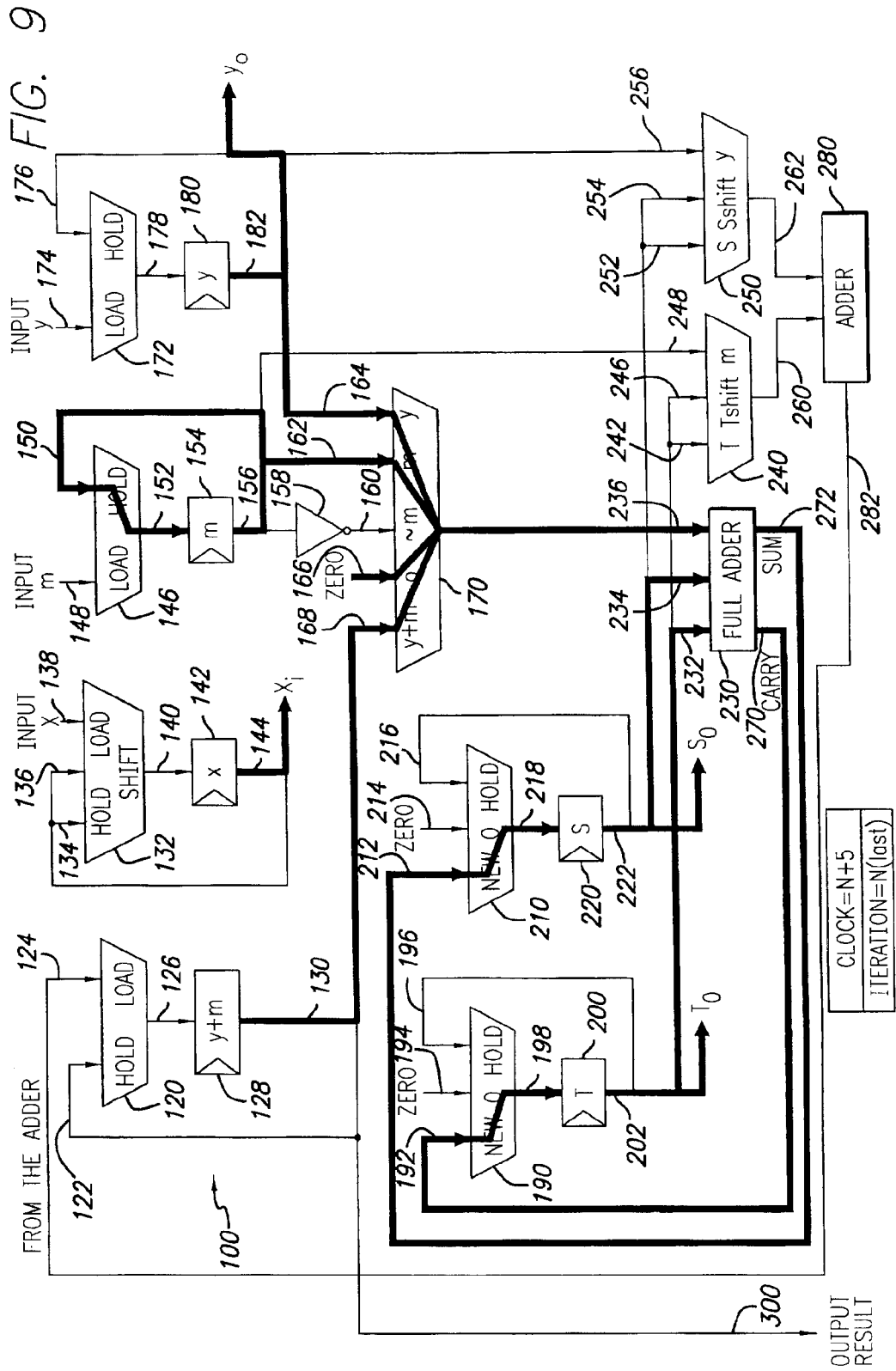
FIG. 9 is the schematic block diagram of FIG. 1 shown at clock cycle=N+5 and iteration=N.

For clock cycle 5, as shown in FIG. 7, the value of result y+m returns as the output of the ADDER 280 and is provided as the input LOAD 124 of multiplexer 120. Furthermore, during this clock cycle, the values of S and T are initialized to zero. These zero values are provided as input 194 for multiplexer 198 and as input 214 for multiplexer 210. For each clock cycle 6, 7, ..., N+4, as shown in FIG. 8, there is one iteration per clock cycle. The values of $x_i$, $y_0$, $S_0$, $T_0$ are used to set the multiplexer 170 to select one of y+m, 0, m, or y for each clock cycle. The x value is shifted right by one bit each clock cycle to position it so that $x_i$ is always in the least significant position. The values of S and T are provided as the input into the multiplexers 190 and 210, respectively, so that the division by "2" is accomplished. These iterations and clock cycles continue until the last iteration N is reached. The last iteration N and its corresponding clock cycle N+5 is shown in FIG. 9.

Figure 10:
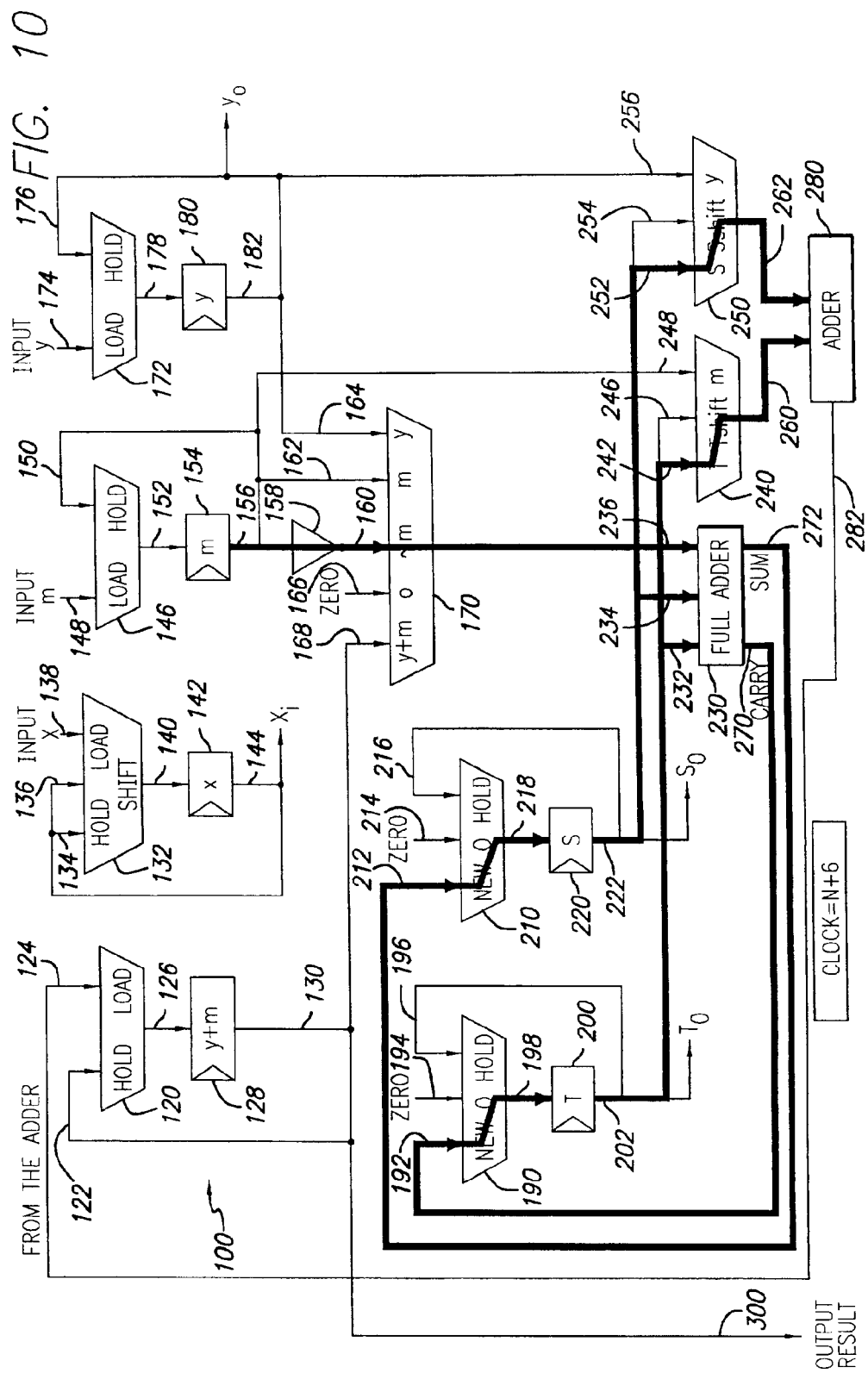
FIG. 10 is the schematic block diagram of FIG. 1 shown at clock cycle=N+6.
Figure 11:
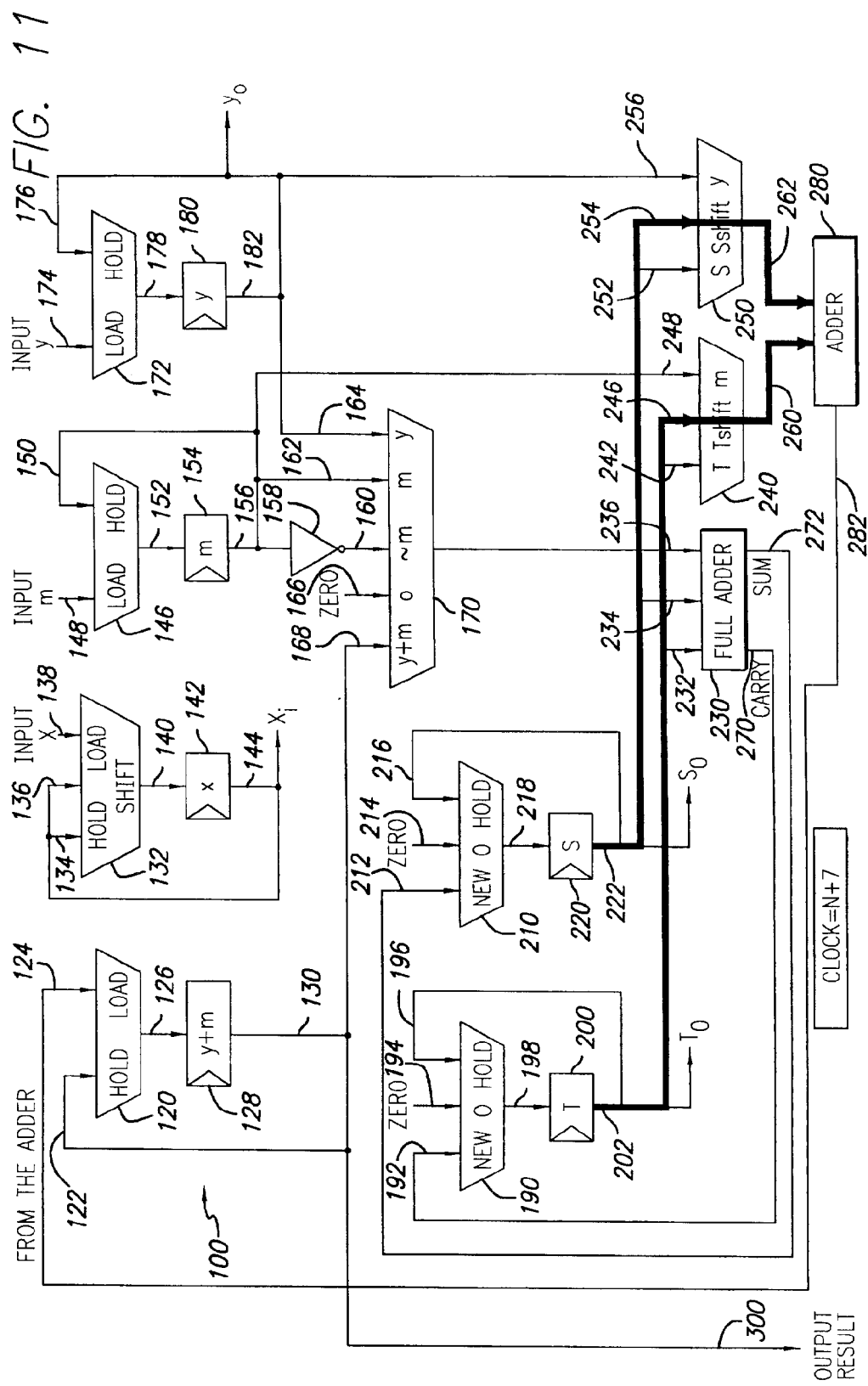
FIG. 11 is the schematic block diagram of FIG. 1 shown at clock cycle=N+7.

FIG. 10 provides the details of events at clock cycle N+6. At this point, values of S and T are sent to the ADDER 280. Furthermore, values of S, T. and ~m are provided as the input to the FULL ADDER 230, giving new values of S and T as outputs SUM 272 and CARRY 270, respectively. At the next clock cycle N+7, as shown in FIG. 11, the new values of S, T, and a "1" are sent to the ADDER 280. These values are multiplexed differently than in the previous clock cycle because the operation divide by "2" has to be undone.

Figure 12:
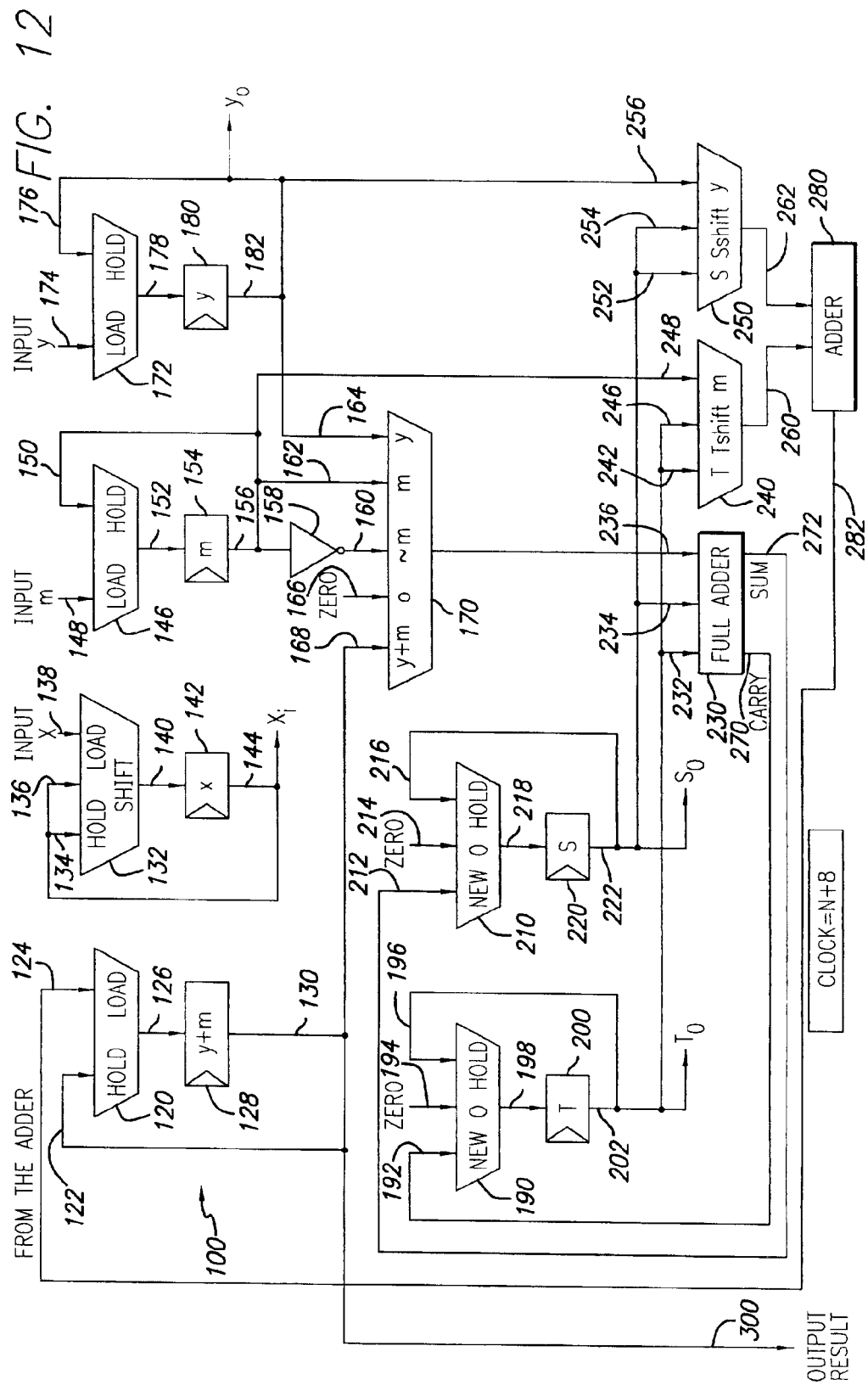
FIG. 12 is the schematic block diagram of FIG. 1 shown at clock cycle N+8.
Figure 13:
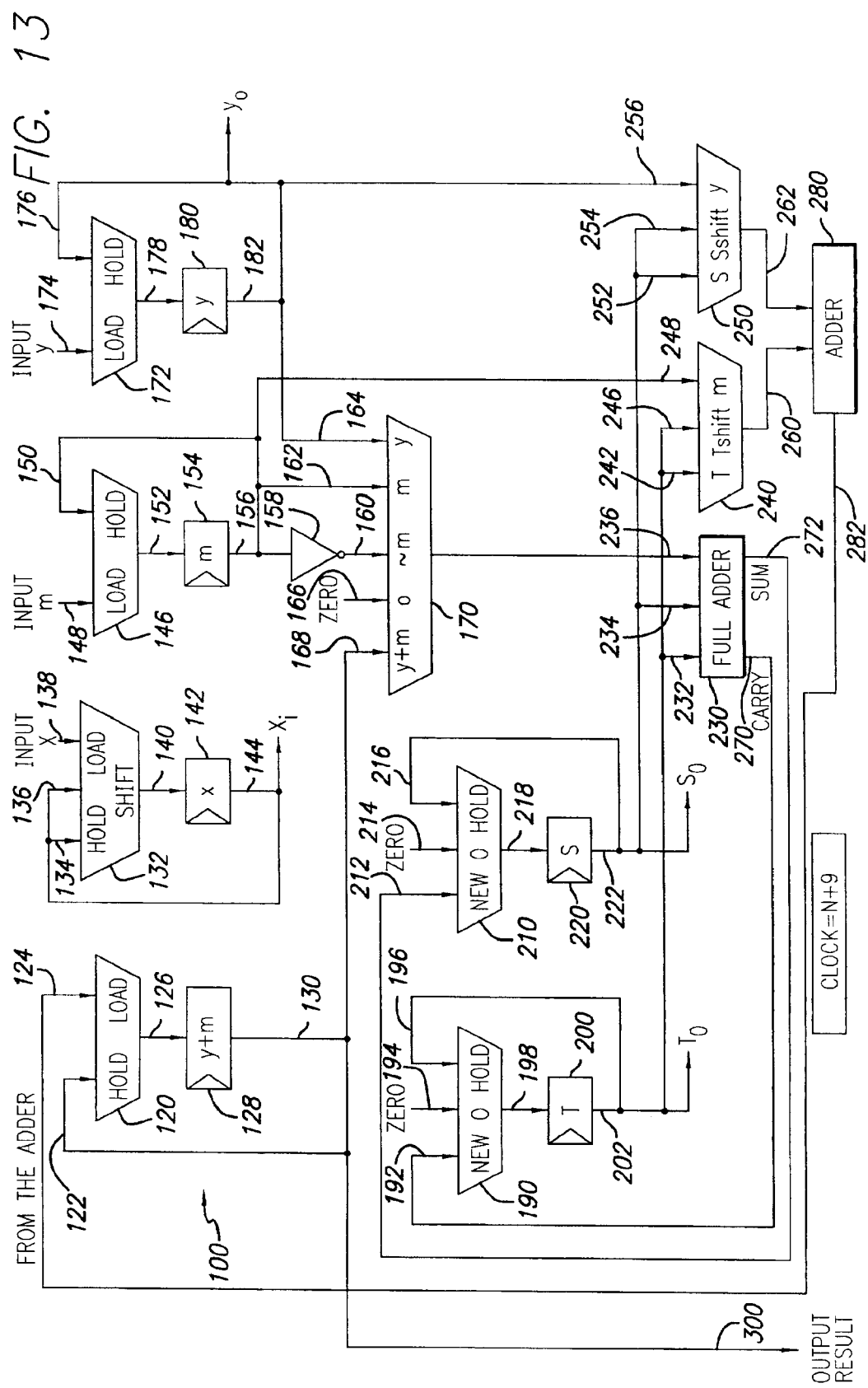
FIG. 13 is the schematic block diagram of FIG. 1 shown at clock cycle=N+9.
Figure 14:
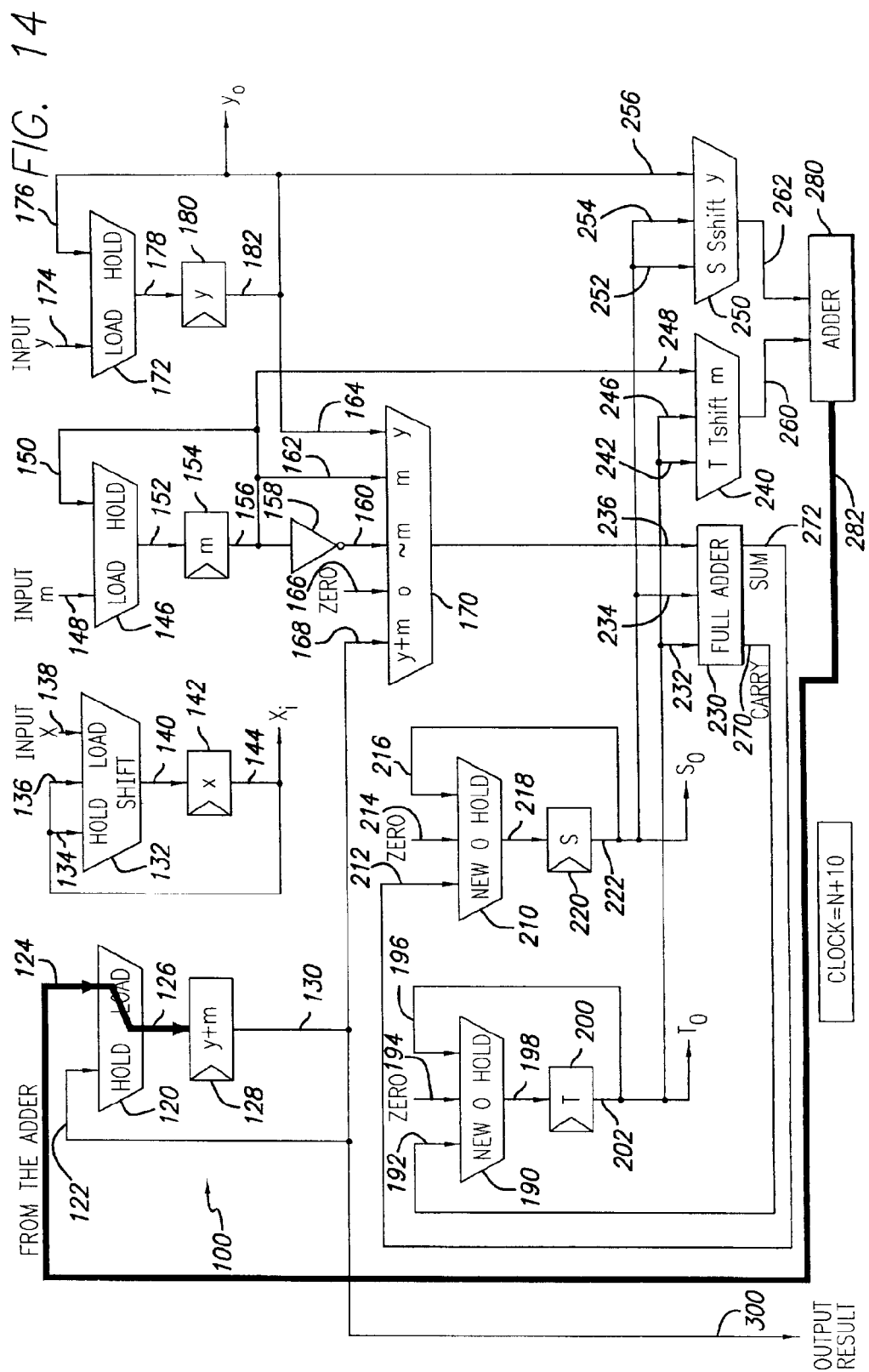
FIG. 14 is the schematic block diagram of FIG. 1 shown at clock cycle=N+10.
Figure 15:
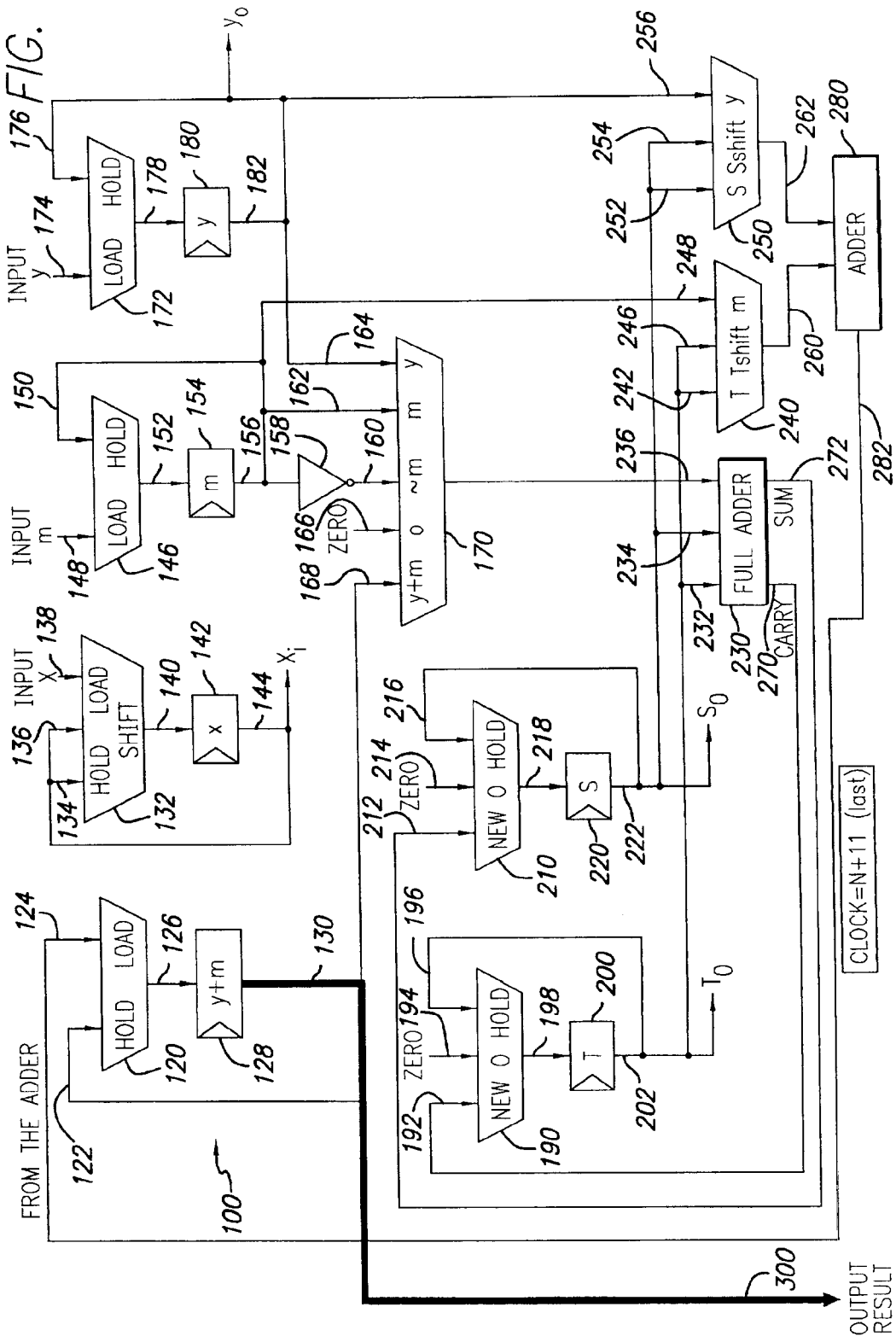
FIG. 15 is the schematic block diagram of FIG. 1 shown at clock cycle=N+11.

Clock cycles N+8 and N+9, as shown in FIGS. 12 and 13, respectively, are occupied for the calculation of the ADDER 280. It should be noted that the ADDER 280 is constructed so that if S+T−m is positive (the result of the add started in clock cycle N+7), then the value of S+T−m is returned; otherwise, the value of S+T is returned (the result of the add started in clock N+6). As shown in FIG. 14, at clock cycle N+10, the result output 282 from the ADDER 280 is returned. Finally, as shown in FIG. 15, at clock cycle N+11, the desired answer is found as the output result 300.

In an embodiment of the invention, the Montgomery multiplication algorithm described above is used in performing a Montgomery exponentiation. The notation Mont(x, y, m) shall be used to denote the Montgomery multiplication $yxR^{-1}$ mod m according to the above algorithm. Then, the algorithm for Montgomery exponentiation is as follows:

INPUT: integers m, e, and x, where m has s bits, e has t+1 bits, and 0<x<m.
OUTPUT: $x^e$ mod m.
1. Compute $R=b^s$
2. Compute R*R mod m
3. Compute z=Mont(x, R*R mod m, m)
4. Compute B=R mod m.
5. For i from t to 0 do the following:
   5.1 B=Mont (B, B, m)
   5.2 If $e_i$=1 then B=Mont (B, z, m)
6. B=Mont (B, 1, m)
7. Return B.

While there are other ways to compute $x^e$ mod m, all the efficient ways use Montgomery multiplication. Accordingly, it should be appreciated that the efficiency of the Montgomery exponentiation can be further improved by using Montgomery multiplication as set forth above using the redundant notation and thereby avoid the carry look-ahead addition while executing the Montgomery multiplication iterations.

Having thus described a preferred embodiment of efficient modular exponentiation for Montgomery multiplication, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

What is claimed is:

1. In a Montgomery multiplication algorithm, a method of computing an output $xyR^{-1}$ mod m from input integers $m=(m_{n-1} \ldots m_1m_0)_b$, $x=(x_{n-1} \ldots x_1x_0)_b$, $y=(y_{n-1} \ldots y_1y_0)_b$, with $0 \leq x, y<m$, $R=b^n$ with gcd(m, b)=1, and $m'=-m^{-1}$ mod b comprising the steps of:

representing a value A in the Montgomery multiplication algorithm with a redundant notation; and performing carry-save addition within an iterative process of the Montgomery multiplication algorithm to compute a new value of A, and further comprising executing the algorithm:

a. S←0 and T←0 (where $S=(s_ns_{n-1} \ldots s_1s_0)_b$ and $T=(t_nt_{n-1} \ldots t_1t_0)_b$.)
b. For i from 0 to (n-1), do the following:
   b1. $u_i \leftarrow (s_0+t_0+x_iy_0)$ m' mod b
   b2. (S, T)←(S+T+$x_i$y+$u_i$m)/b
c. $A_1 \leftarrow$S+T and $A_2 \leftarrow$S+T-m
d. If $A_2 \geq 0$ then A←$A_2$ else A←$A_1$
e. Return A.

2. The method of claim 1, wherein the value of b is two.

3. The method of claim 1, wherein step b2 of the algorithm further comprising selecting one of y+m, y, m, or 0 to be added to S and T.

4. The method of claim 1, wherein said representing step further comprises replacing said value of A with two other values, wherein a sum of the other two values equals said value of A.

5. The method of claim 1, wherein said performing step further comprises performing said carry-save addition in parallel.

6. The method of claim 1, wherein said performing step further comprises executing said iterative process a plurality of times equal to a number of bits representing said value of x.

7. A method of performing a Montgomery exponentiation of $x^e$ mod m wherein the notation Mont(x, y, m) denotes the Montgomery multiplication algorithm $yxR^{-1}$ mod m from input integers $m=(m_{n-1} \ldots m_1m_0)_b$, $x=(x_{n-1} \ldots x_1x_0)_b$, $y=(y_{n-1} \ldots y_1y_0)_b$, with $0 \leq x, y<m$, $R=b^n$ with gcd(m, b)=1, and $m'=-m^{-1}$ mod b comprising the steps of:

representing a value A in the Montgomery multiplication algorithm with a redundant notation; and performing carry-save addition within an iterative process of the Montgomery multiplication algorithm to compute a new value of A, wherein m has s bits. e has t+1 bits, and 0<x<m, and the Montgomery exponentiation is performed according to the algorithm:

a. Compute $R=b^s$
b. Compute R*R mod m
c. Compute z=Mont(x, R*R mod m, m)
d. Compute B=R mod m
e. For i from t to 0 do the following:
   e.1 B=Mont (B, B, m)
   e.2 If $e_i$=1 then B=Mont (B, z, m)
f. B=Mont (B, 1, m)
g. Return B.

8. The method of claim 7, further comprising executing the algorithm for Mont (x, y, m):

a. S←0 and T←0 (where $S=(s_ns_{n-1} \ldots s_1s_0)_b$ and $T=(t_nt_{n-1} \ldots t_1t_0)_b$.)
b. For i from 0 to (n-1), do the following:
   b1. $u_i \leftarrow (s_0+t_0+x_iy_0)$ m' mod b
   b2. (S,T)←(S+T+$x_i$y+$u_i$m)/b
c. $A_1 \leftarrow$S+T and $A_2 \leftarrow$S+T-m
d. If $A_2 \geq 0$ then A←$A_2$ else A←$A_1$
e. Return A.

9. The method of claim 8, wherein the value of b is two.

10. The method of claim 8, wherein step b2 of the algorithm further comprising selecting one of y+m, y, m, or 0 to be added to S and T.

11. The method of claim 7, wherein said representing step further comprises replacing said value of A with two other values, wherein a sum of the other two values equals said value of A.

12. The method of claim 7, wherein said performing step further comprises performing said carry-save addition in parallel.

13. The method of claim 7, wherein said performing step further comprises executing said iterative process a plurality of times equal to a number of bits representing said value of x.

14. The method of claim 7, further comprising solving a plurality of Montgomery multiplication problems simultaneously.

15. The method of claim 14, and further comprising controlling selection of values to be added to S and T corresponding to each said of said plurality of Montgomery multiplication problems.

16. An apparatus for performing a Montgomery multiplication for an output of $xyR^{-1}$ mod m and an input of $m=(m_{n-1} \ldots m_1m_0)_b$, $x=(x_{n-1} \ldots x_1x_0)_b$, $y=(y_{n-1} \ldots y_1y_0)_b$, with $0 \leq x, y<m$, $R=b^n$ with gcd(m, b)=1, and $m'=-m^{-1}$ mod b, comprising:

a plurality of storage units, with each one of the plurality of storage units corresponding to a value of x, m, y, S and T, where A=S+T, wherein the corresponding storage unit for x can shift its value, and the corresponding storage units for S and T can be set to zero;

an adder configured to add the k terms from $x_i$ times y, the k terms from $u_i$ times m, and S and T; and a carry look-ahead adder configured to add any one set of values from a group including S and T, and S shifted and T shifted.

17. The apparatus of claim 16, wherein for b greater than or equal to two, the adder further comprises a carry-save adder within an iterative process of the Montgomery multiplication algorithm to compute a new value of A.

18. The apparatus of claim 17, wherein said carry-save adder further comprises a Wallace tree.

19. The apparatus of claim 16, wherein b is equal to two.

20. The apparatus of claim 19, wherein the adder further comprises a full adder configured to add input values of S, T, and any one value from a group consisting of m, y, m+y, zero, and ~m in to produce a sum value and a carry value.

21. The apparatus of claim 16, wherein said plurality of storage units and said added are operatively coupled to execute the algorithm:
  a. $S \leftarrow 0$ and $T \leftarrow 0$ (where $S=(s_{n-1} \ldots s_1 s_0)_b$, and $T=(t_n t_{n-1} \ldots t_1 t_0)_b$.)
  b. For i from 0 to (n−1), do the following:
   b1. $u_i \leftarrow (s_0+t_0+x_i y_0)$ m' mod b
   b1. $(S,T) \leftarrow (S+T+x_i y+u_i m)/b$.

22. The apparatus of claim 21, wherein said carry look-ahead adder is adapted to execute the algorithm:
  c. $A_1 \leftarrow S+T$ and $A_2 \leftarrow S+T-m$
  d. If $A_2 \geqq 0$ then $A \leftarrow A_2$ else $A \leftarrow A_1$.

23. The apparatus of claim 21, wherein the storage units corresponding to said value of x, y, m, y+m, S, and T are further adapted to hold a plurality of Montgomery multiplication problems that are solved simultaneously, and further comprising means for controlling the selection of values to be added to S and T corresponding to each said of said plurality of Montgomery multiplication problems.

24. The apparatus of claim 23, wherein for each of said plurality of Montgomery multiply problems, the carry look-ahead adder is adapted to execute the algorithm:
  c. $A_1 \leftarrow S+T$ and $A_2 \leftarrow S+T-m$
  d. If $A_2 \geqq 0$, then $A \leftarrow A_2$, else $A \leftarrow A_1$.

* * * * *